UNITED STATES PATENT OFFICE.

ROBERT E. LYONS, OF BLOOMINGTON, INDIANA.

PROCESS OF RECOVERING RUSTY GOLD AND NATIVE PLATINUM METALS.

1,118,944.  Specification of Letters Patent.  Patented Dec. 1, 1914.

No Drawing.   Application filed November 17, 1913.  Serial No. 801,514.

*To all whom it may concern:*

Be it known that I, ROBERT E. LYONS, a citizen of the United States, residing at Bloomington, in Monroe county, State of Indiana, have invented certain new and useful Improvements in the Process of Recovering Rusty Gold and Native Platinum Metals, of which the following is a specification.

The invention relates to the recovery of metals which are covered with a non-amalgamating coating, or which characteristically do not amalgamate, and relates particularly to the recovery of gold in a natural state when covered with a coating of other materials which prevent the same from amalgamating with mercury. Heretofore many attempts have been made to recover metals of this character which are found in relatively large quantities in placer deposits of various localities, and various processes, such as roasting, chlorination and treatment with cyanid of potassium have been employed. All such processes are objectionable, however, because of the cost of treatment and the time required.

I have discovered that the coating which prevents a particle of gold from amalgamating can be removed by subjecting the particle to the action of a suitable metal at ordinary temperatures in the presence of a substance capable of attacking said metal which will rend or otherwise neutralize the non-amalgamating coating. I have also discovered that under suitable conditions platinum in its native state can be recovered by forming a combination or alloy therewith at ordinary temperatures which is capable of amalgamating with mercury.

It is known that if amalgamated zinc is subjected to the action of a bath or a solution containing a relatively small percentage of a suitable acid, such as sulfuric acid, that the zinc will be slowly attacked by the acid and that small quantities of hydrogen will be evolved. When such amalgam is brought into contact with the particle of gold or platinum, this action is greatly increased and hydrogen is evolved with considerable rapidity, and I have also discovered that this action takes place practically to the same extent although the particle of gold is covered with an envelop of other materials that will prevent direct amalgamation.

In the recovery of gold which is covered with a coating of non-amalgamating material, frequently called rusty gold, my improved process consists in subjecting the particles to the action of a metal capable of alloying with gold, such as zinc, in a bath or solution of a suitable acid, such as sulfuric acid, which is capable of causing the generation of hydrogen in considerable quantities when such metal is brought into contact with the particle or coating thereof. Preferably the zinc is used in the form of a zinc amalgam, since the action of the acid upon such amalgam is relatively slow until it is brought into contact with the particle when hydrogen is evolved almost as rapidly with the amalgam as with the metallic zinc. The mercury may also serve as a carrier for the zinc to bring it into more intimate contact with the coating on the particle than otherwise. The coating is then attacked and stripped or fractured, in part by the pressure exerted by hydrogen gas bubbles generated on the surface of the gold beneath the coating or film of non-amalgamating material, and in part by the formation of combinations with the coating or elements thereof, which may be soluble to a greater or lesser extent in the solution or bath. As soon as the surface of the metallic gold is exposed by stripping, fracturing or rending of the envelop or film surrounding the same, the particle is amalgamated by the mercury contained in the zinc amalgam or by an excess supply of mercury which may be added, if desired. My improved process can also be applied in the recovery of platinum. It is well known that this metal will not amalgamate with mercury under ordinary conditions, but an alloy of this metal with zinc will amalgamate readily and in carrying out my process the zinc amalgam is brought into contact with the native platinum in the presence of the solution whereby a zinc alloy is formed with the platinum which then amalgamates with the zinc amalgam, or with particles of mercury freed by the combining of zinc with the platinum. In this case also the hydrogen which is evolved when the platinum is brought into contact with the zinc or zinc amalgam probably tends to cleanse the surface of the platinum and permits the alloying process to take place more rapidly and effectively than is otherwise possible.

Although I have referred particularly to zinc in carrying out my improved process, it is obvious that certain other metals, such for example, as a zinc bismuth alloy may be used instead of metallic zinc. It will be obvious, however, that copper and similar metals cannot be used in place of zinc, since copper does not alloy either with gold or with platinum at ordinary temperatures, nor do copper and such metals cause the evolution of sufficient hydrogen to enable my process to be carried out.

Various well-known methods may be employed for bringing the particle of rusty gold or of platinum into contact with the zinc and mercury or the zinc amalgam in the presence of the proper solution and therefore need not be described. Preferably the amalgam is in a fluid or flowing condition especially if excess mercury be added and the materials are thoroughly mixed by tumbling the same in a suitable barrel or cylinder. The strength of the solution varies with the material used and to some extent with the conditions of use, but I have found in practice that a solution from one to three per cent. of sulfuric acid and a one per cent. zinc amalgam will give satisfactory results if the mercury and zinc are relatively clean. Instead of sulfuric acid, other suitable agents, for example a corresponding solution of hydrochloric acid may be substituted therefor with good result.

It is obvious that various changes in the strength of the solution and in the nature of the materials and the manner of combining the same which are within the knowledge of those skilled in the art may be made without departing from the spirit of the invention, provided the method set forth in the following claims be employed.

I claim as my invention:—

1. The process of recovering precious metals consisting in adding to material containing particles of precious metal in a condition that will not normally amalgamate, a metal capable of alloying with the precious metal at normal temperatures, metallic mercury in quantity sufficient to form a substantial amount of amalgam, and a substance capable of attacking the alloying metal, such attacking substance being in quantity sufficient to maintain a continuous reaction during amalgamation of the precious metal.

2. The process of recovering precious metal consisting in adding to material containing particles of precious metal in a condition that will not normally amalgamate, an amalgam normally stable in water comprising a metallic substance electro-chemically more positive than mercury and a substance capable of attacking the positive metallic substance in the presence of the precious metal particle, and maintaining a continuous reaction to evolve hydrogen on the surface of the precious metal particle until said particle is amalgamated.

3. The process of recovering precious metals consisting in adding to material containing the precious metals in a condition that will not normally amalgamate, an amalgam containing a metallic substance capable of alloying with the precious metal at ordinary temperatures and a reagent capable of attacking the alloying metallic substance, said reagent being added in sufficient quantity to maintain a continuous reaction until the precious metal particle is amalgamated.

4. The process of recovering precious metals consisting in adding to material containing the precious metal in a condition that will not normally amalgamate, a metal capable of alloying with the precious metal at normal temperatures, metallic mercury in quantity sufficient to form a fluid amalgam of the alloying metal and a reagent capable of attacking the alloying metal and evolving nascent hydrogen on the surface of the precious metal, such reagent being added in sufficient quantity to maintain a continuous reaction until the precious metal is amalgamated.

5. The process of recovering precious metal consisting in adding to material containing precious metal in a condition that will not normally amalgamate, mercury, and a metal electro-chemically more positive than mercury and capable of forming in amalgam normally stable in water in quantity to produce a substantial amount of amalgam, and a reagent capable of attacking said positive element to evolve hydrogen on the surface of the precious metal in sufficient quantity to permit the same to be amalgamated.

6. The process of recovering precious metal consisting in adding to material containing particles of precious metal in a condition that will not normally amalgamate, an amalgam containing zinc and a reagent capable of attacking the zinc to evolve nascent hydrogen on the surface of the precious metal in sufficient quantity to cause the precious metal particle to amalgamate with said amalgam.

7. The process of recovering precious metals consisting in adding to material containing particles of precious metal in a condition that will not normally amalgamate a preformed amalgam containing zinc and an acid capable of attacking the zinc in the presence of a precious metal particle to evolve nascent hydrogen thereon, said reagent being added in sufficient quantity to produce a continuous reaction during amalgamation.

8. The process of recovering particles of gold covered with a coating that normally prevents amalgamation which consists in adding to material containing said particles, mercury and a metal normally stable in water and electro-chemically more positive than mercury to form a fluid amalgam, and a substance capable of attacking the electro-positive metal to evolve nascent hydrogen from the precious metal particles, maintaining said reaction until the coating is sufficiently destroyed to permit effective contact of the amalgam and then amalgamating said particles.

9. The process of recovering particles of gold covered with a coating that prevents amalgamation which consists in adding to material containing said particles a preformed amalgam normally stable in water of a metal electro-chemically more positive than mercury, and a substance capable of attacking said positive metal when the amalgam is brought in contact with a particle and evolving nascent hydrogen in sufficient quantity to rend the coating, and then amalgamating said particle.

10. The process of recovering particles of gold covered with a coating that prevents amalgamation which consists in adding a preformed zinc amalgam to the material containing such particles and an acid capable of continuously attacking the zinc to evolve nascent hydrogen in sufficient quantity to rend the coating and then amalgamating the particles.

11. The process of recovering particles of gold covered with a coating comprising a film capable of being ruptured by gas generated beneath the same that normally prevents amalgamation which consists in removing the coating by continuously liberating nascent hydrogen on the particles in the presence of mercury, a solution of an acid, and a substance amalgamable with mercury and reacting with the acid to evolve hydrogen until the coating is sufficiently destroyed to permit effective contact of the mercury and then amalgamating said particles.

12. The process of recovering precious metal consisting in adding to material containing particles of precious metal in a condition that will not normally amalgamate, zinc, a substance capable of reacting with zinc to liberate hydrogen in considerable amount, and metallic mercury in quantity sufficient to form a fluid zinc amalgam with said zinc, and maintaining said reaction during amalgamation of the precious metal.

This specification signed and witnessed this 13th day of November, A. D., 1913.

ROBERT E. LYONS.

Signed in the presence of—
U. H. SMITH,
S. C. DAVISSON.